United States Patent
Dyck et al.

(10) Patent No.: US 7,961,724 B2
(45) Date of Patent: Jun. 14, 2011

(54) DYNAMIC MEDIA ACCESS CONTROL (MAC) ADDRESS ASSIGNMENT

(75) Inventors: Jeffrey Alan Dyck, San Diego, CA (US); Uppinder S. Babbar, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1252 days.

(21) Appl. No.: 11/084,672

(22) Filed: Mar. 18, 2005

(65) Prior Publication Data

US 2006/0221846 A1    Oct. 5, 2006

(51) Int. Cl.
H04L 12/28 (2006.01)
(52) U.S. Cl. ....................... 370/389; 370/401
(58) Field of Classification Search .................. 370/401, 370/252, 254, 338, 389, 392, 400
See application file for complete search history.

(56) References Cited

U.S. PATENT DOCUMENTS

| | | | |
|---|---|---|---|
| 6,816,467 B1 * | 11/2004 | Muller et al. | 370/256 |
| 7,246,272 B2 * | 7/2007 | Cabezas et al. | 714/53 |
| 2003/0177267 A1 | 9/2003 | Orava et al. | 709/245 |
| 2004/0141468 A1 | 7/2004 | Christensen et al. | 370/252 |
| 2004/0194082 A1 * | 9/2004 | Purkeypile et al. | 717/174 |
| 2005/0014468 A1 * | 1/2005 | Salokannel et al. | 455/41.2 |
| 2006/0109802 A1 * | 5/2006 | Zelig et al. | 370/258 |

FOREIGN PATENT DOCUMENTS

| | | |
|---|---|---|
| JP | 2003143157 | 5/2003 |
| JP | 2004048175 | 2/2004 |
| JP | 2004112120 | 4/2004 |
| WO | 0036794 | 6/2000 |

OTHER PUBLICATIONS

1110/Research Disclosure. "Fast Duplicate Address Detection During Registration Wireless LAN". Aug. 1998. pp. 1-2. XP-002238532.
Balden, Bruce. "USB RNDIS/CDC White Paper". USB RNDIS CDC Network Options—Belcarra Technologies Corp. Jan. 2003. pp. 1-9. XP-002389884.
CDC Ethernet Emulation Model. "Universal Serial Bus Communications Class Subclass Specification for Ethernet Emulation Model Devices". Revision 1.0. Feb. 2005. pp. 1-42 XP-002389885.
Greenberg, Ben, et al. "IP-Over-USB Gateway Final Project Report". Apr. 2005. pp. 1-18. XP-002389883.

* cited by examiner

*Primary Examiner* — Man Phan
*Assistant Examiner* — Nourali Mansoury
(74) *Attorney, Agent, or Firm* — Kenyon Jenckes; Eric Ho

(57) ABSTRACT

According to the invention an embodiment, a network node for communicating using a MAC address is disclosed. The network node includes a point-to-point interface, a bridge and a MAC address register. The point-to-point interface uses a first protocol. The bridge is coupled to the point-to-point interface and provides a fixed route for the Ethernet interface. The first protocol encapsulates the data of a second protocol. The MAC address register stores the MAC address for the second protocol, were the MAC address is dynamically determined in the field and written to the MAC address register. The MAC address is used when communicating with the network node through the point-to-point interface.

40 Claims, 10 Drawing Sheets

DYNAMIC MEDIA ACCESS CONTROL (MAC) ADDRESS ASSIGNMENT

BACKGROUND OF THE DISCLOSURE

This disclosure relates in general to ethernet connections and, more specifically, but not by way of limitation, to media access control (MAC) addresses for ethernet connections.

A point-to-point Ethernet connection is a common configuration today. Where Ethernet is also the physical layer, a cross-over cable is used to connect two Ethernet nodes. In some cases, another physical layer can be used for point-to-point connections, for example, universal serial bus (USB), FireWire™, RS-232, wireless, etc. When a different physical layer is used, it still appears to be Ethernet from above the data link layer.

A point-to-point Ethernet connection uses physical MAC addresses for addressing data, where each end has a MAC address assigned. The common method to assign MAC addresses is to methodically pre-assign the MAC values from a range bought by the vendor. Each node is administratively assigned a unique MAC address prior to use. This address is static, i.e., the same value is used for the lifespan of the device. Each node on an ethernet network should have a unique MAC address for routing of data packets to function properly.

An Ethernet MAC address or hardware ID is a 48 bit value. The MAC address can be generally broken down into two 24 bit fields, namely the vendor and device identifiers. A particular manufacturer may rents a particular vendor identifier, e.g., for a yearly fee. The 24 bit device identifier allows 16,777,216 unique IDs associated with that vendor identifier to be assigned by that manufacturer. As more nodes are shipped, more vendor identifiers are purchased.

BRIEF SUMMARY OF THE DISCLOSURE

In one embodiment, the present disclosure provides an Ethernet network node that may communicate on an Ethernet network and which is identified by a MAC address. The network node could be a computer or a device attached to the computer in one embodiment. The network node includes a point-to-point interface, an Ethernet interface, a bridge connecting the Ethernet interface to the point-to-point interface and a MAC address register. The point-to-point interface uses a first protocol, for example, USB or Firewire™. The bridge couples the point-to-point and Ethernet interfaces, encapsulating the second protocol within the first protocol. In one embodiment, the first protocol is USB and the second protocol is Ethernet. The MAC address register stores the MAC address for the second protocol, where the MAC address is dynamically determined in the field and written to the MAC address register. The MAC address is used by the Ethernet to communicate with another network node via the point-to-point connection.

In another embodiment, the present disclosure further provides a method for dynamically assigning an ethernet media access control (MAC) address for a point-to-point connection between two nodes. In one example, the two nodes are a computing device and a wireless cellular modem attached with a USB cable. A first node of the two nodes is released into the field with a first MAC address field that is programmable. A check is performed to determine which MAC addresses are used by other like nodes on the same network, i.e., nodes that are distinguished by means of a shared or known ethernet vendor identifier. A first MAC address that is unique on the local subnet is chosen for programming into the first MAC address field. The programming of the first MAC address field happens automatically in the field. The first MAC address is sent to a second node. The first node communicates with the second node using the first MAC address.

In yet another embodiment, the present disclosure also provides a method for dynamically assigning an MAC address for a connection between two nodes. A second node of the two nodes is released into the field with a second MAC address field that is programmable. In one embodiment, the second MAC address field is assigned each time the second node is connected to a host already connected to a first node. A second MAC address is determined for the second node, where the second MAC address is unique on a network. Each time the second node is connected, a different second MAC address could be determined. The second MAC address is loaded into the second MAC address field when the second node is deployed in the field unlike conventional network nodes that assign their MAC address before deployment in the field. Communication is performed with a first node of the two nodes using the second MAC address.

BRIEF DESCRIPTION OF THE DRAWINGS

The present disclosure is described in conjunction with the appended figures.

Figure 1A:
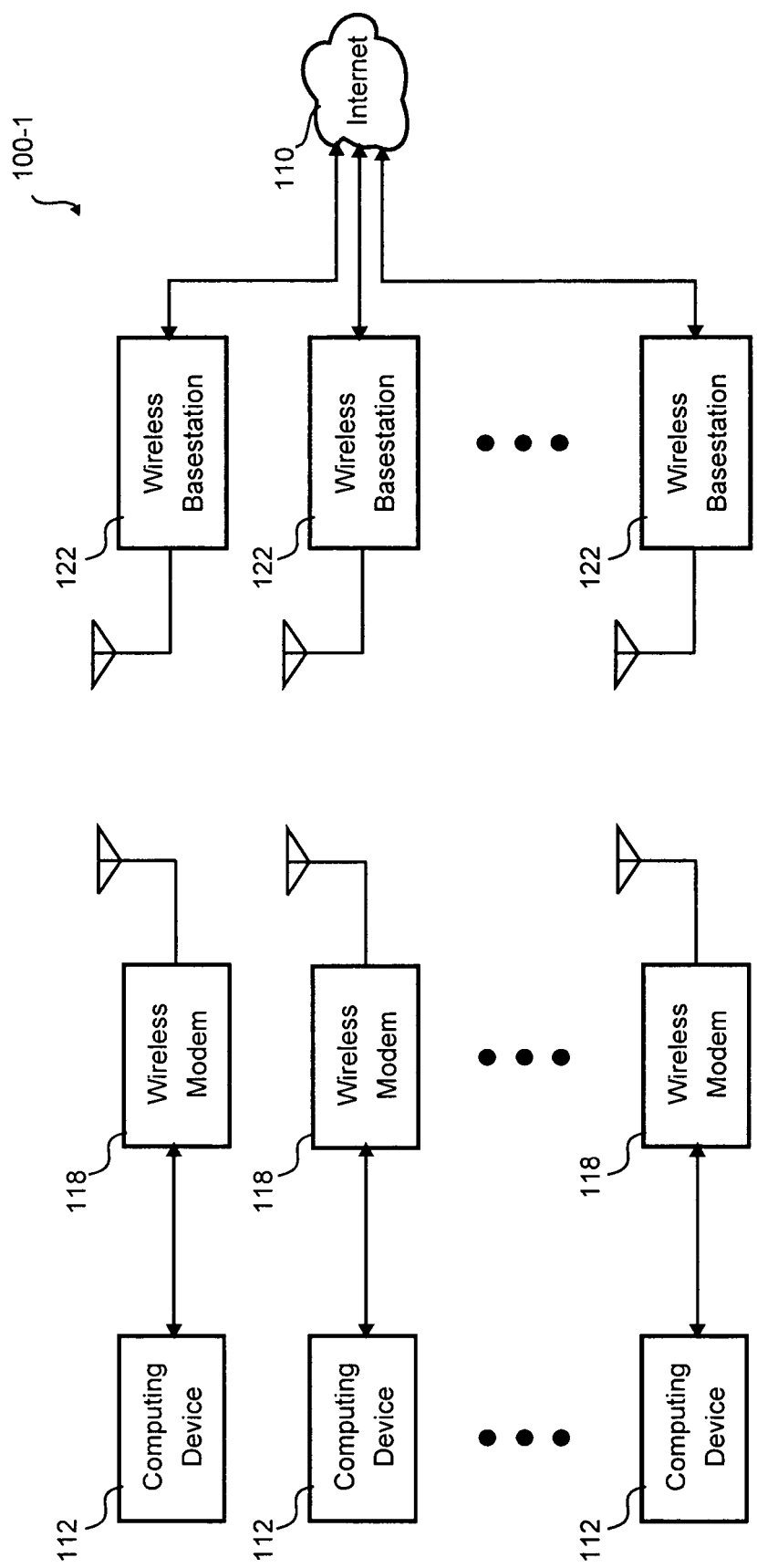
FIGS. 1A, 1B, 1C, and 1D are block diagrams of embodiments of a wireless networking system.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE PREFERRED EMBODIMENT

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various Various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits may be represented with block with block diagrams in order to facilitate understanding of the invention. It is understood by one skilled in the art that certain elements not present in the diagrams may be used to implement and communicate using an Ethernet network node. In other instances, well-known circuits, structures and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data. "The field" is a term disclosed in this application that applies to equipment after it has left the premises of the equipment manufacturer.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as any storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Referring initially to FIG. 1A, a block diagram of an embodiment of a wireless networking system 100-1 is shown. The depicted embodiment shows a number of computing devices 112 respectively connected to a number of wireless modems 118. A number of wireless base stations base stations 122 variously communicate with the wireless modems 118. The Internet 110 is linked to the wireless base stations 122 by various means.

A particular computing device 112 has an attached wireless modem 118 to allow communication at the link layer using ethernet protocols, but other embodiments could use various link layer protocols. The computing device 112 could include a PDA, tablet computer, a desktop computer, a navigation device, a video player, a music player, a telemetry device, and/or any other electronic device that connects to a remote network. The computing device may have various applications that communicate with peer applications via the Internet 110.

A wireless modem 118 is separate from the computing device, but has a cable or wireless connection with the computing device and the wireless base station. The connection between the computing device and wireless modem has a physical layer using a protocol that is different from a protocol used at the link layer. For example, the protocol of the physical layer could be RS-232, RS-422, USB, FireWire™, Bluetooth™, optical fiber, infra-red wireless, WiFi, WiMax, cable modem, DSL, BPL, or any other point-to-point protocol.

The wireless base station base station 122 is a cellular phone or data base station base station in this embodiment. In other embodiments, the wireless base station base station could be any wireless type of base station, for example, WiMax, WiFi, optical laser transmission, microwave, satellite, or any other wireless networking technology. This embodiment shows a direct connection to the Internet 110, but the connection could be indirectly through any number of other networking components.

Although this embodiment relates to the connection between a computing device 112 and a wireless modem 118, the disclosure is not intended to be so limited. In other embodiments, the connection could between any two devices that have a unique MAC or other type of address at the link layer to represent each of the network nodes. For example, the link layer could be token ring, ethernet, PPPP, etc.

Figure 1B:
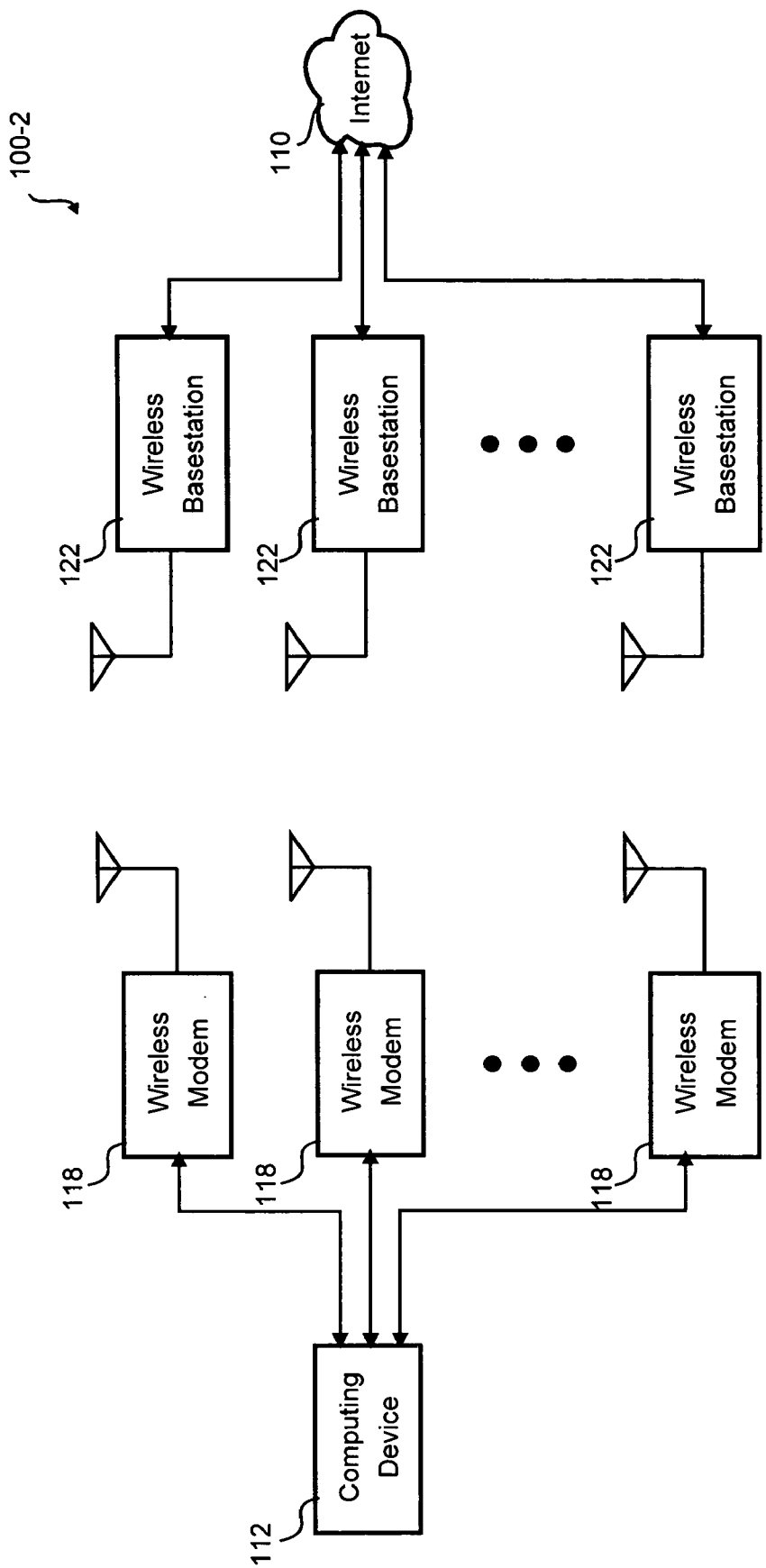

With reference to FIG. 1B, a block diagram of another embodiment of the wireless networking system 100-2 is shown. In this embodiment, one computing device has multiple attached devices, namely, wireless modems 118. The various attached devices may use the same or different protocols. Each of the wireless modems 118 is assigned a unique identifying number or MAC address. This embodiment dynamically assigns the MAC addresses such that as each new wireless modem 118 is attached, a check is performed to be sure the chosen MAC address is not already in use.

Figure 1C:
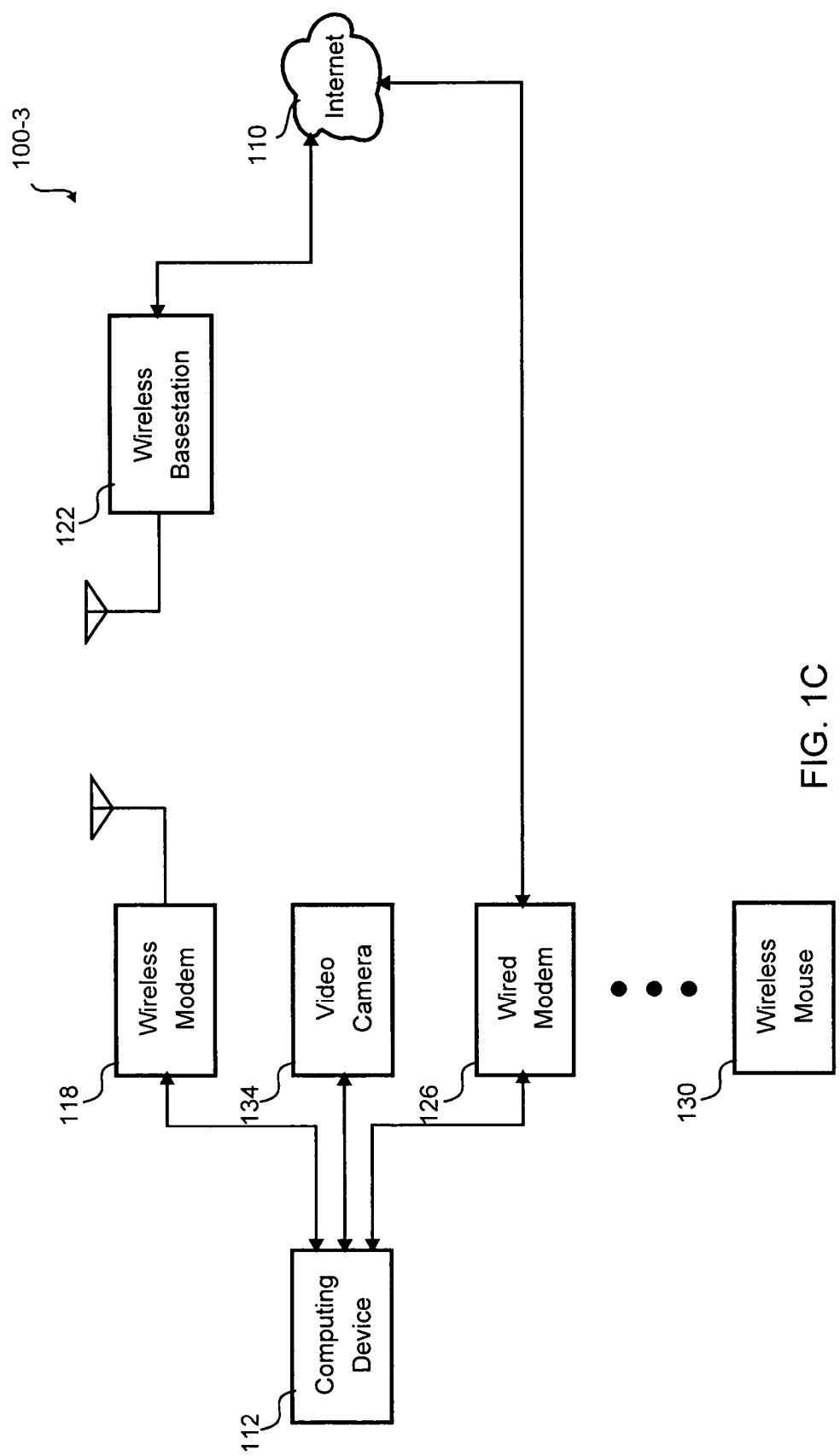

Referring next to FIG. 1C, a block diagram of another embodiment of the wireless networking system 100-3 is shown. In this embodiment, a wireless modem 118, a wired modem 126, a mouse 130, a video camera 134, and possibly other attached network devices are all coupled to the computing device 112. The attached devices are dynamically assigned a MAC or other address from the perspective of the computer device.

Figure 1D:
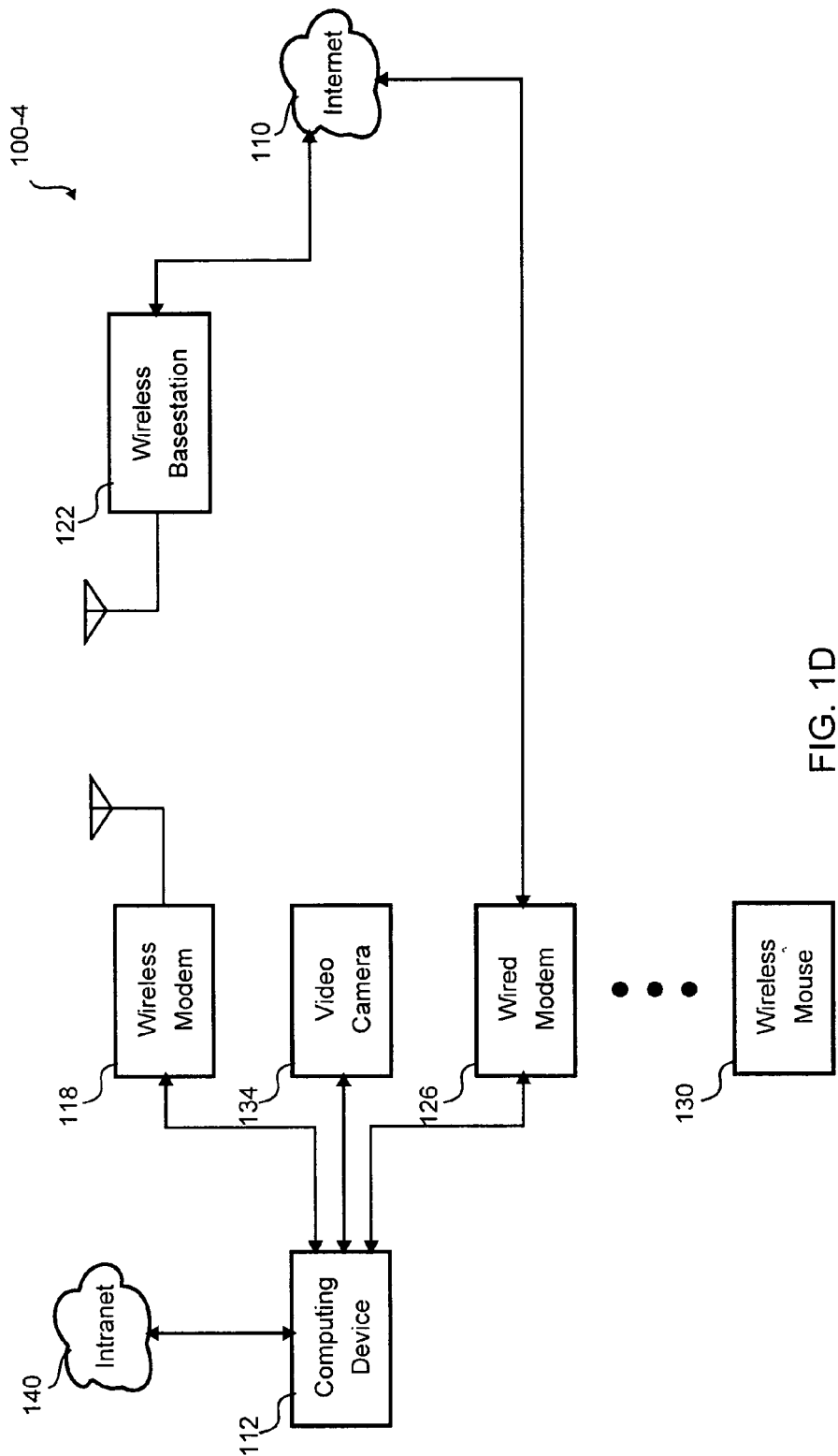

With reference to FIG. 1D, a block diagram of another embodiment of the wireless networking system 100-4 is shown. In this embodiment, the computing device 112 is connected to an intranet 140. The intranet could have any number of other computing devices, where each could have any number of attached devices. Some network protocols require each attached device for each computing device on the entire intranet 140 to have a unique address or MAC address.

Figure 2A:
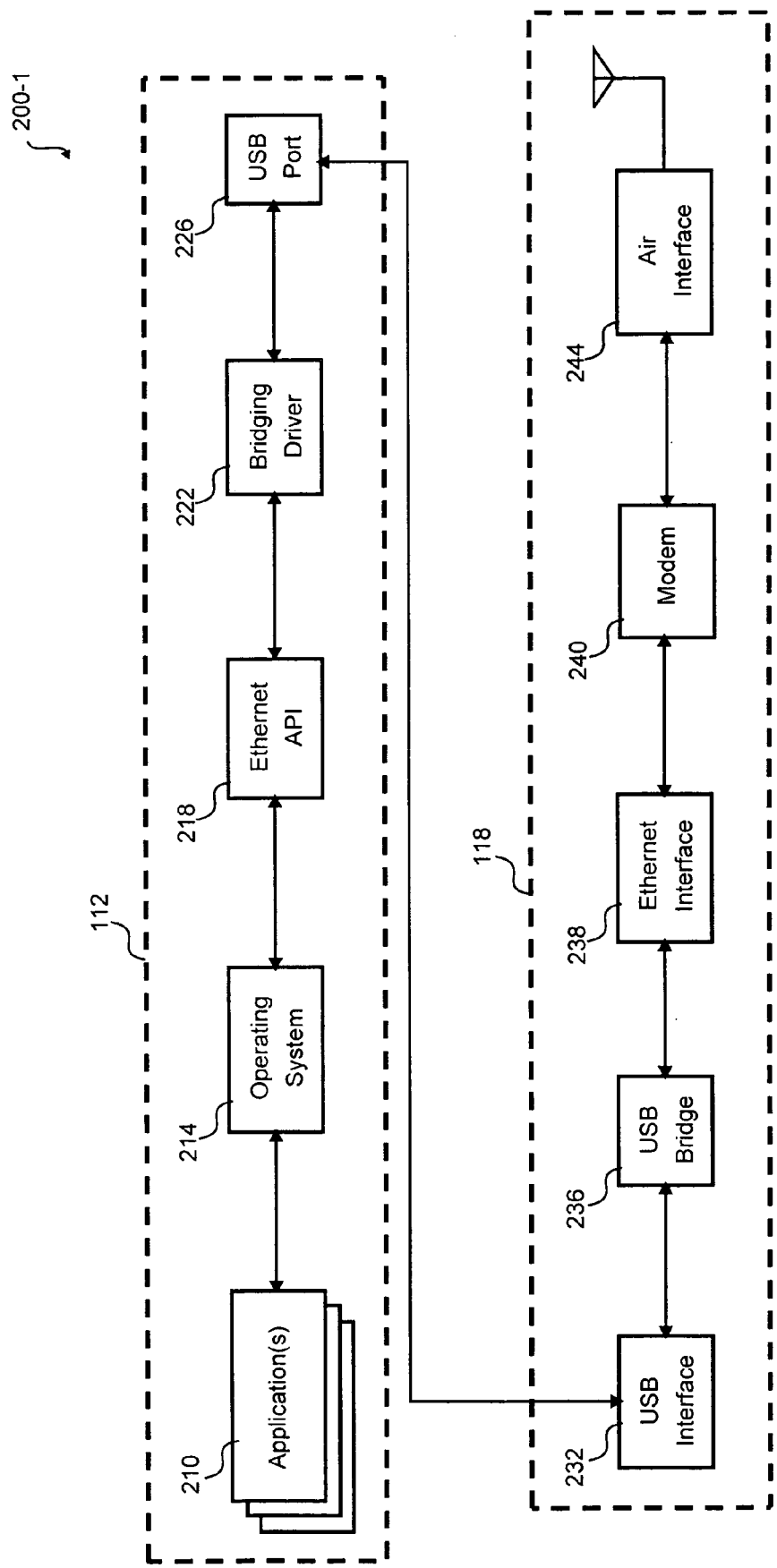
FIGS. 2A and 2B are block diagrams of embodiments of a networked computer system.

Referring next to FIG. 2A, a block diagram of an embodiment of a networked computer system 200-1 is shown. In this embodiment, the computing device 112 is coupled to a wireless modem 118, but any attached device could be used in other embodiments. The computing device 112 is coupled to the wireless modem using a USB cable, but other embodiments could use other wired or wireless media for this connection.

The computing device 112 in this embodiment includes any number of applications 210, an operating system 214, an ethernet application programming interface (API) 218, a bridging driver 222, a USB port 226, and other items that are not depicted. The applications 210 and/or operating system 214 could be network aware and utilize the network connection with the wireless modem 118. The operating system 210 and applications 214 communicate via the ethernet API 218. Each node on an ethernet network has a MAC address hence in this embodiment the ethernet API appears to have a MAC address as does the wireless modem 118. The computing device 112 may be connected to other networks and could serve as a bridge, switch or router between the wireless modem 118 and those other networks.

The bridging driver 222 appears to the operating system 214 as an ethernet card, but is implemented in software. The ethernet API 218 communicates information using an ethernet link layer protocol that is converted by the bridging driver 222 to a format that can be used by the USB port 226. Included in the USB port 226 is an USB API, a driver and a physical circuit. The bridging driver 222 implements ethernet over USB by encapsulating the ethernet link layer protocol to use the USB physical layer by interaction with the USB API of the USB port 226. Where there are multiple attached devices, multiple bridging drivers 222 could be loaded or a single bridging driver 222 could implement the ethernet over USB function. Where there are multiple bridging drivers 222 attached to the same computing device, they can communicate to their peers when determining which MAC addresses are available for use.

The wireless modem 118 includes a USB interface 232, a USB bridge 236, a modem 240, and an air interface 244. The USB interface 232 allows bi-directional communication with the computing device 112 using a USB physical layer. The ethernet link layer is transported over the USB physical layer. Conversion from a USB physical layer to an ethernet layer occurs in the USB bridge 236. This embodiment includes an Ethernet interface 238 that provides a network interface to communicate with the modem 240 which is served by the USB bridge 236. The modem 240 believes it is communicating with the computing device 112 using an ethernet protocol because of the effort of the USB bridge 236 and other blocks in this communication chain. Data destined for the air interface 244 is modulated and return data is demodulated in the modem 240. The modem 240 can dynamically assign a MAC address itself or derive one with information received from the computing device 112.

Figure 2B:
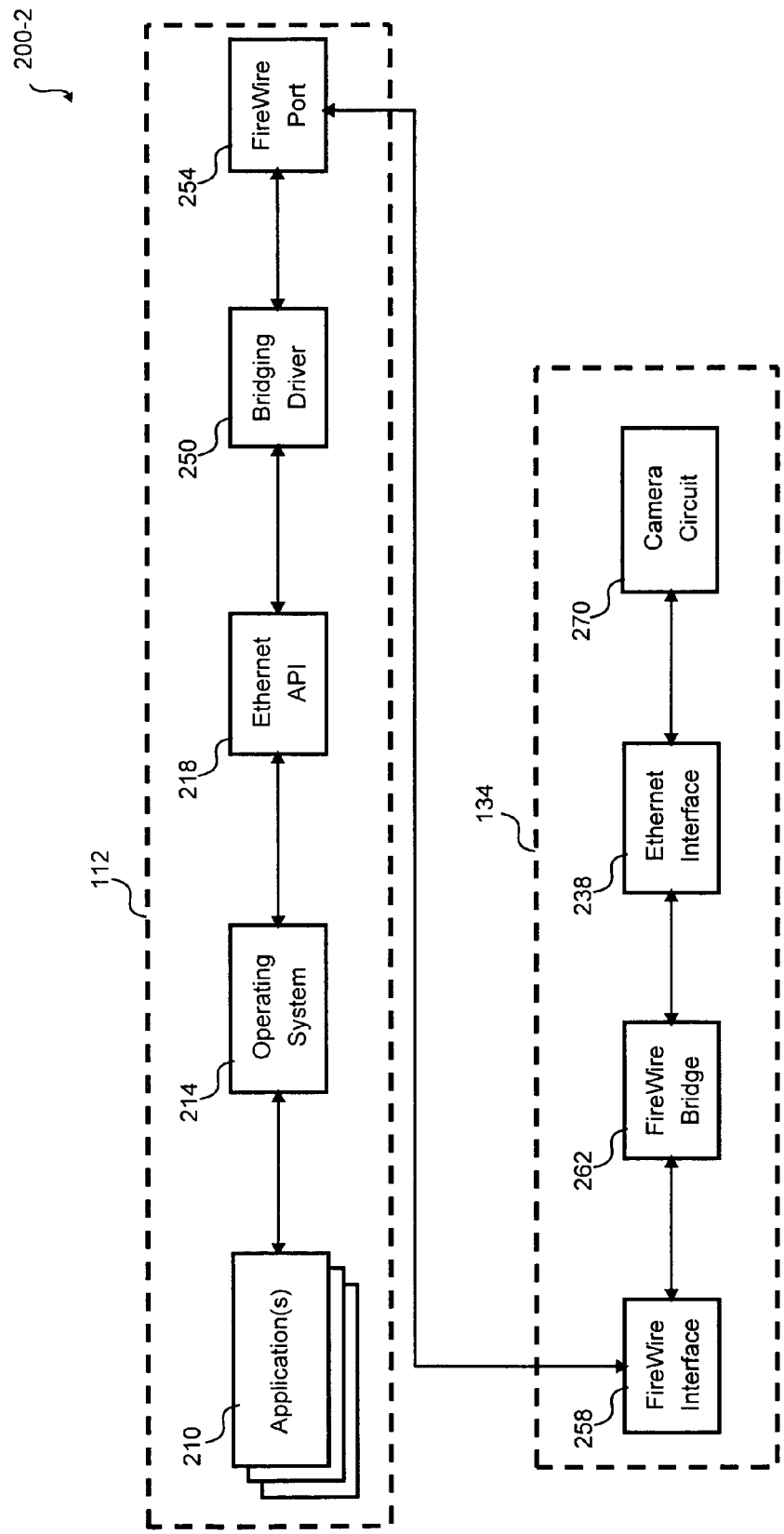

With reference to FIG. 2B, a block diagram of another embodiment of the networked computer system 200-2 is shown. This embodiment interfaces the computing device 112 with a video camera 134. The physical interface between the two devices is FireWire™. A bridging driver implements ethernet over FireWire™ by interacting an API of the FireWire™ port 254. Included in the video camera 134 is a camera circuit 270, a FireWire™ bridge 262 and a FireWire™ interface 258. The FireWire™ bridge converts the FireWire™ physical layer to serve the Ethernet interface 238 that can communicate with the camera circuit 270 having an Ethernet port.

Figure 3A:
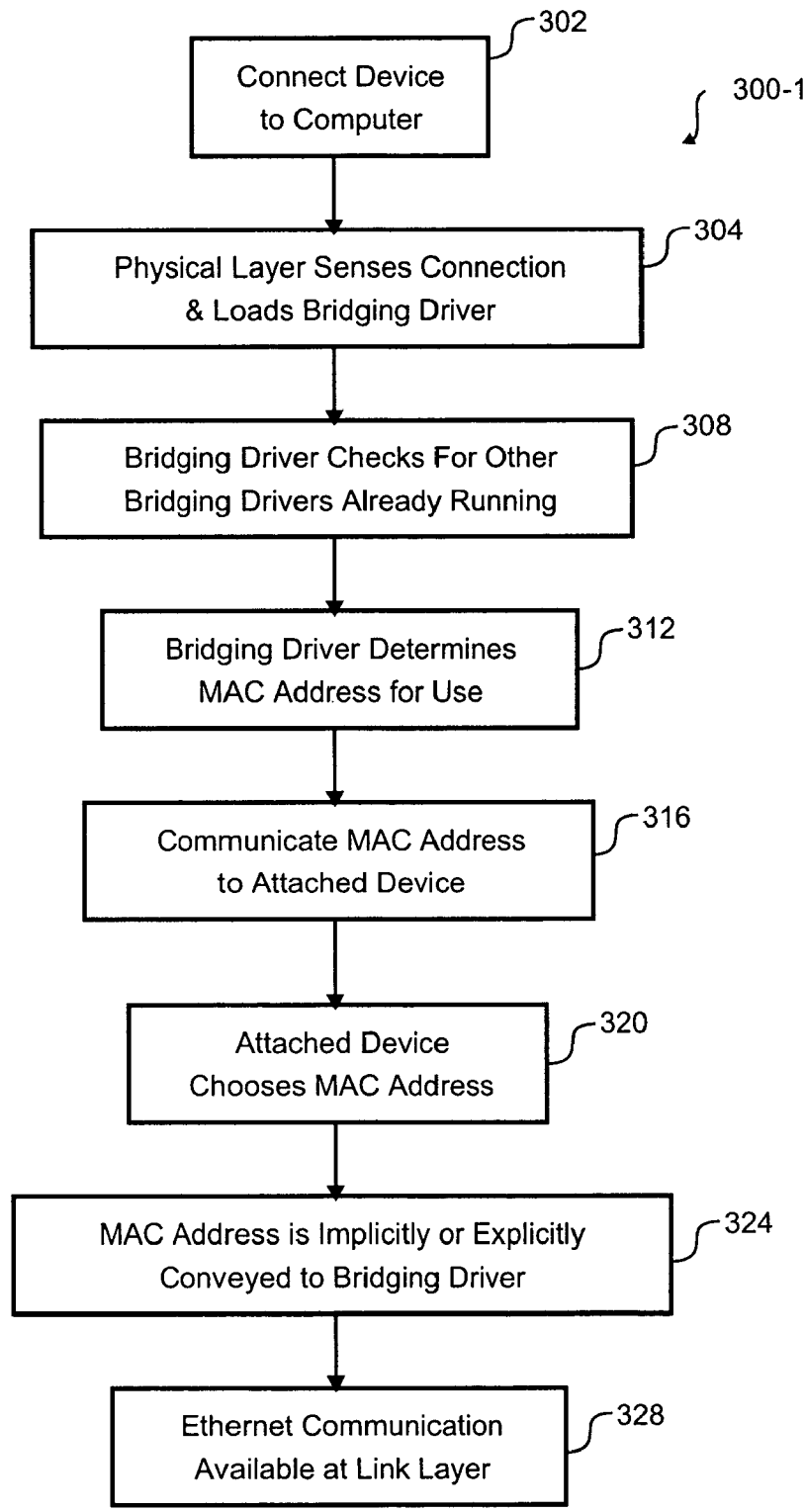
FIGS. 3A, 3B, 3C, and 3D are flow diagrams of embodiments of a process for configuring communication between a computer and an attached device.

Referring next to FIG. 3A, a flow diagram of an embodiment of a process 300-1 for configuring communication between a computer 112 and an attached device is shown. The depicted portion of the process 300-1 begins in step 302 where the device is attached to the computing device 112, for example, a USB cable is connected between the attached device USB interface 232 and the computing device 112 USB port 226. The physical layer senses a connection with the attached device in step 304, which automatically causes loading of the bridging driver 222 if it isn't already loaded. In some cases, the bridging driver isn't loaded until manually done by loading an application 210 or otherwise by the user.

In this embodiment, the bridging driver 222 chooses a MAC address in a multi-step process that assures there are no conflicts with other devices on the local subnet or attached to the same computing device. In step 308, the bridging driver 222 checks for other bridging drivers 222 that might be already running. The MAC addresses for any running bridging drivers 222 are noted. In this embodiment all bridging drivers 222 use the same vendor identifier that is reserved or rented such that no other type of device will have the same vendor identifier. In this way, only bridging drivers 222 that use the same vendor identifier could possibly have duplicate MAC addresses. In step 312, the bridging driver 222 randomly chooses a device identifier from those not currently used by another bridging driver 222. The previously assigned vendor identifier is combined with the dynamically-chosen device identifier to determine the MAC address for the bridging driver 222.

Once the computing device end of the point-to-point connection is chosen, the other endpoint chooses a MAC address. In this embodiment, the attached device derives its MAC address from the bridging driver MAC address. In step 316, the chosen MAC address of the bridging driver 222 is communicated to the attached device using a USB control channel, but any other means of communication could be used in other embodiments. The attached device chooses a MAC address in step 320 by using the same device identifier as the bridging driver 222, but prepending that with a vendor identifier that is different from the one used by the bridging driver 222. The vendor identifier used by the attached device is controlled by the manufacturer of the attached device to eliminate the likelihood that it might appear elsewhere on any network.

The bridging driver 222 can presume the MAC address of the attached device in step 324 by knowing how it will choose a MAC address. In this embodiment, the bridging driver impliesying the value of the MAC address of the attached device, makes making it unnecessary to actually communicate the chosen MAC address. Once the MAC addresses are known further configuration may occur before ethernet communication is available at the link layer in step 328. In this embodiment, only two vendor identifiers are used to allow communication between the two devices.

Figure 3B:
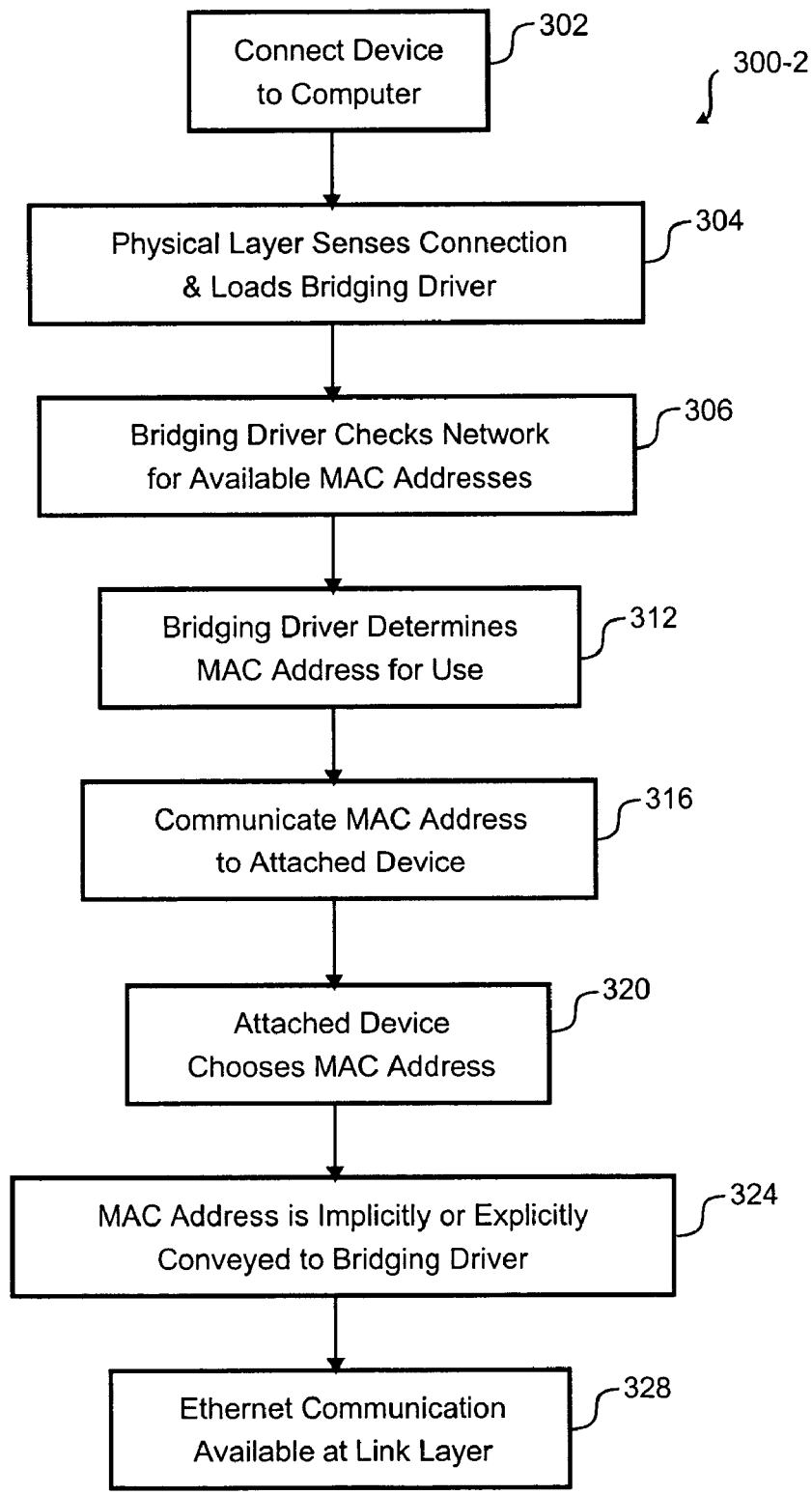

With reference to FIG. 3B, a flow diagram of an embodiment of a process 300-2 for configuring communication between a computer 112 and an attached device is shown. This embodiment differs from the embodiment of FIG. 3A in that step 308 is replaced with step 306. Vendor identifiers are not reserved for the bridging driver in this embodiment. In step 306, the bridging driver checks for MAC addresses used by other bridging drivers 222, checks the operating system records for MAC addresses in use by other network interface controllers and checks the remainder of the attached network using a RARP request. A random MAC address can then be selected that is not used elsewhere on the intranet 140.

The attached device could make a predetermined choice of its MAC address in step 320 such that the bridging driver 222 implicitly knows what will be chosen. For example, the MAC address of the attached device may be derived by adding sixteen to the MAC address of the bridging driver 222. Knowing what the attached device will choose, the bridging device 222 can choose its address in a way such that the address of the attached device will not conflict either.

Figure 3C:
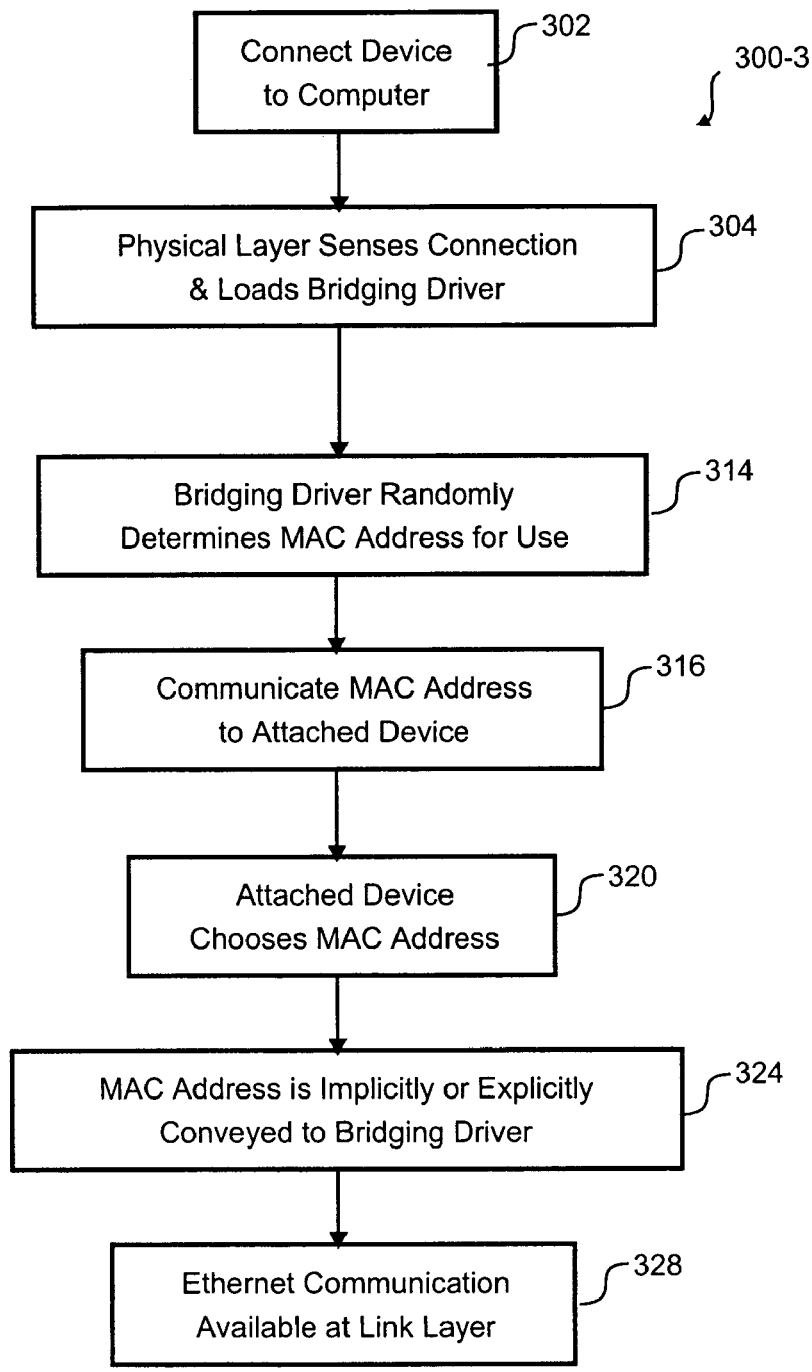

Referring next to FIG. 3C, a flow diagram of an embodiment of a process 300-3 for configuring communication between a computer 112 and an attached device is shown. In this embodiment, there are no steps 306 or 308 as the bridging driver simply chooses at random a MAC address in step 314. The likelihood that the MAC address is used elsewhere on the network is slight. A new one could be chosen if the bridging driver 222 later detects a conflict or some sort of improper operation. The MAC address of the attached device in this embodiment is set at the factory to be unique. The attached device communicates the pre-assigned MAC address to the bridging driver 222 in step 324 via a USB control channel.

Figure 3D:
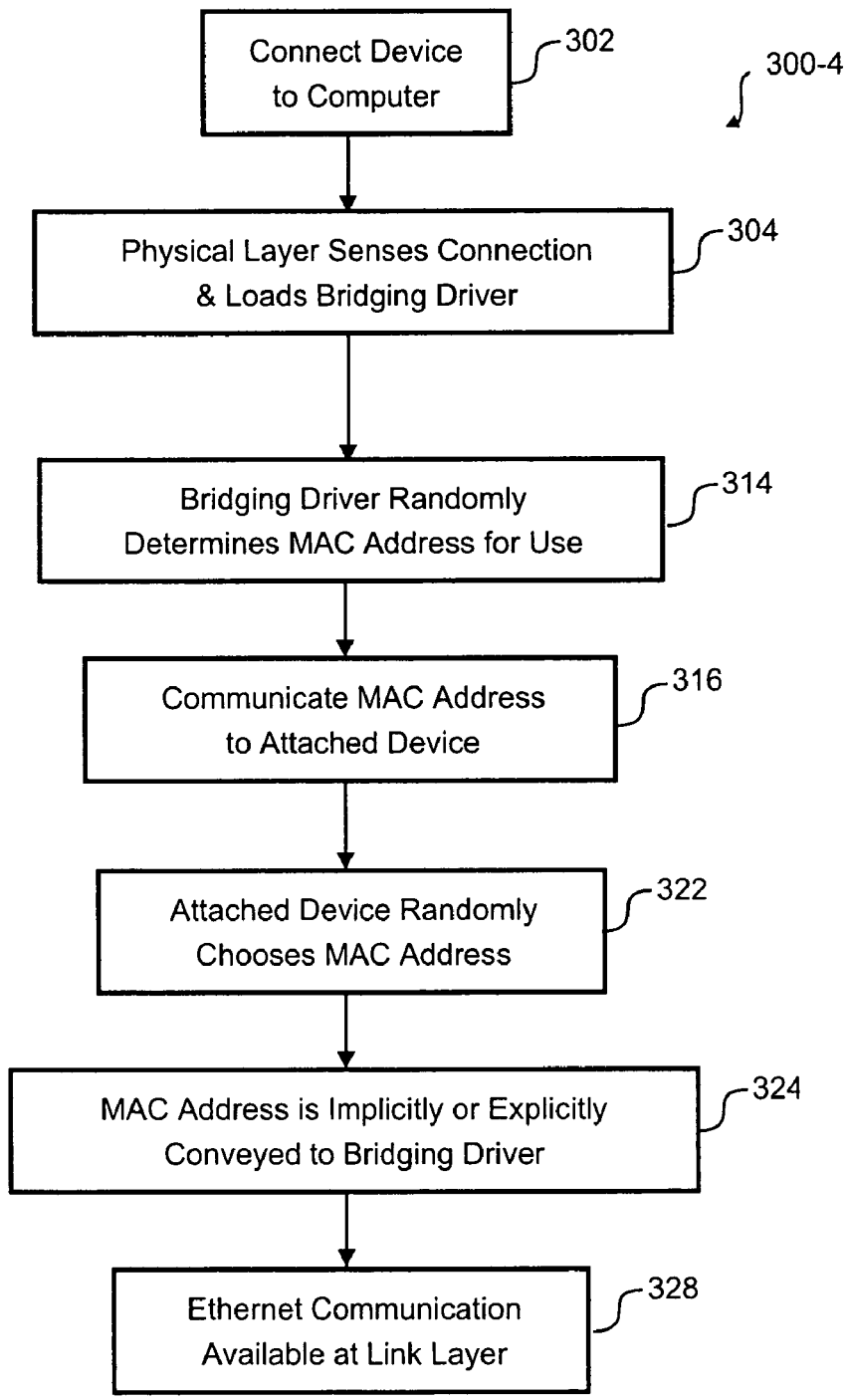

With reference to FIG. 3D, a flow diagram of an embodiment of a process 300-4 for configuring communication between a computer 112 and an attached device is shown. In this embodiment, there are no steps 306 and 308. Both the bridging driver 222 and the attached device randomly choose their MAC addresses respectively in steps 314 and 322. There is little likelihood of any redundancy, but if communication broke down, new MAC addresses could be randomly chosen again in another attempt to avoid redundancy.

In another embodiment, both the physical layer and the link layer could be ethernet. Each end would randomly choose MAC addresses to allow initial communication, but those MAC addresses would only be used for initial configuration and not reported to the operating system 214 or applications 210. Using this temporary ethernet channel, the MAC addresses could be adjusted so as to minimize the risk of redundancy. Once any changes are done, the MAC addresses would be reported to the operating system 214 and applications 210.

While the principles of the invention have been described above in connection with specific apparatuses and methods, it is to be clearly understood that this description is made only by way of example and not as limitation on the scope of the invention.

What is claimed is:

1. A method for dynamically assigning Ethernet media access control (MAC) addresses for use in a point-to-point connection between two nodes, the method comprising:
   with a first node of the two nodes, in response to sensing that a second node of the two nodes is coupled to the first node via the point-to-point connection:
   dynamically selecting a first Ethernet MAC address for the first node, the first Ethernet MAC address comprising a first vendor identifier and a first device identifier, wherein at least one of the first vendor identifier or the first device identifier is dynamically selected;
   programming the first Ethernet MAC address into a first MAC address register; and
   communicating with the second node via the point-to-point connection using the first Ethernet MAC address from the first MAC address register and a second Ethernet MAC address associated with the second node, wherein the second Ethernet MAC address comprises a second vendor identifier and a second device identifier, wherein the second vendor identifier is different from the first vendor identifier, and wherein the second device identifier either comprises the first device identifier or an identifier that is dynamically selected from the first device identifier.

2. The method as recited in claim 1, wherein the point-to-point connection comprises at least one of: a universal serial bus (USB), a FireWire™ connection, a serial connection, or a wireless connection.

3. The method as recited in claim 1, wherein the first Ethernet MAC address comprises the first vendor identifier concatenated with the first device identifier.

4. The method as recited in claim 1, further comprising communicating the first Ethernet MAC address to the second node before the second node has been associated with the second Ethernet MAC address.

5. The method as recited in claim 1, wherein the dynamically selecting the first Ethernet MAC address for the first node comprises:
   determining that the first Ethernet MAC address is not being used by other like nodes on a network coupled to the first node.

6. The method as recited in claim 1, further comprising communicating the first Ethernet MAC address to the second node using a control channel on the point-to-point connection.

7. The method as recited in claim 1, further comprising encapsulating a first transport layer between the two nodes over a second transport layer different from the first transport layer.

8. The method as recited in claim 1, further comprising decapsulating frames from a USB transport layer between the two nodes to provide an Ethernet transport layer.

9. The method as recited in claim 1, wherein the second Ethernet MAC address is received by the first node from the second node.

10. The method as recited in claim 1, wherein the second Ethernet MAC address is determined by the first node.

11. The method as recited in claim 1, wherein the first device identifier is randomly selected, or the identifier is mathematically derived from the first device identifier.

12. An article comprising:
    a non-transitory computer-readable storage medium having computer-executable instructions stored thereon implementable by a computing device to:
    dynamically assign at least one Ethernet media access control (MAC) address for use in a point-to-point connection between two nodes by, in response to sensing that a first node of the two nodes is coupled to a second node of the two nodes via the point-to-point connection, the computing device comprising the first node:
    identifying a first Ethernet MAC address for the first node, wherein the first Ethernet MAC address comprises a first vendor identifier and a first device identifier, wherein at least one of the first vendor identifier or the first device identifier is dynamically selected; and
    programming the first Ethernet MAC address into a selectively programmable first MAC address register of the first node; and
    initiate communication over the point-to-point connection using the first Ethernet MAC address from the first MAC address register and a second Ethernet MAC address associated with the second node, wherein the second Ethernet MAC address comprises a second vendor identifier and a second device identifier, wherein the second vendor identifier is different from the first vendor identifier, and wherein the second device identifier either comprises the first device identifier or an identifier that is dynamically selected from the first device identifier.

13. The article as recited in claim 12, wherein the point-to-point connection comprises at least one of: a universal serial bus (USB), a FireWire™ connection, a serial connection, or a wireless connection.

14. The article as recited in claim 12, wherein the first Ethernet MAC address comprises the first vendor identifier concatenated with the first device identifier.

15. The article as recited in claim 12, the computer-executable instructions being further implementable by the computing device to initiate communication of the first Ethernet MAC address to the second node before the second node has been associated with the second Ethernet MAC address.

16. The article as recited in claim 12, the computer-executable instructions being further implementable by the computing device to determine that the first Ethernet MAC address is not being used by other like nodes on a network coupled to the first node.

17. The article as recited in claim 12, the computer-executable instructions being further implementable by the computing device to initiate communication of the first Ethernet MAC address to the second node using a control channel on the point-to-point connection.

18. The article as recited in claim 12, the computer-executable instructions being further implementable by the computing device to encapsulate a first transport layer between the two nodes over a second transport layer different from the first transport layer.

19. The article as recited in claim 12, the computer-executable instructions being further implementable by the computing device to decapsulate frames from a USB transport layer between the two nodes to provide an Ethernet transport layer.

20. The article as recited in claim 12, wherein the second Ethernet MAC address is received by the first node from the second node.

21. The article as recited in claim 12, wherein the second Ethernet MAC address is determined by the first node.

22. The article as recited in claim 12, wherein the first device identifier is randomly selected, or the identifier is mathematically derived from the first device identifier.

23. A method for dynamically assigning an Ethernet media access control (MAC) address for use in a point-to-point connection between two nodes, the method comprising:
with a second node of the two nodes:
receiving a first Ethernet MAC address as dynamically selected by a first node of the two nodes, the first Ethernet MAC address comprising a first vendor identifier and a first device identifier, wherein at least one of the first vendor identifier or the first device identifier is dynamically selected;
dynamically determining a second Ethernet MAC address for use by the second node via the point-to-point connection, the second Ethernet MAC address comprising a second vendor identifier and a second device identifier, wherein the second vendor identifier is different from the first vendor identifier, and wherein the second device identifier either comprises the first device identifier or an identifier that is dynamically selected from the first device identifier;
programming the second Ethernet MAC address into a second Ethernet MAC address register at the second node; and
communicating with the first node via the point-to-point connection using the second Ethernet MAC address from the second MAC address register.

24. The method as recited in claim 23, wherein the point-to-point connection comprises at least one of: a universal serial bus (USB), a FireWire™ connection, a serial connection, or a wireless connection.

25. The method as recited in claim 23, wherein the first Ethernet MAC address is not being used by other like nodes on a network coupled to the first node.

26. The method as recited in claim 23, wherein the first device identifier is randomly selected, or the identifier is mathematically derived from the first device identifier.

27. A network node for communicating using dynamically selected Ethernet media access control (MAC) addresses, the network node comprising:
a point-to-point interface using a first protocol;
a bridge coupled to the point-to-point interface, wherein the bridge encapsulates the first protocol in a second protocol;
a MAC address register for selectively storing a first Ethernet MAC address for use by the point-to-point interface, wherein the first Ethernet MAC address is dynamically determined in response to the point-to-point interface sensing that an attached node is coupled to the network node via a point-to-point connection, the first Ethernet MAC address comprising a first vendor identifier and a first device identifier, wherein at least one of the first vendor identifier or the first device identifier is dynamically selected; and
the point-to-point interface to provide the first Ethernet MAC address to the attached node and receive a second Ethernet MAC address associated with the attached node, wherein the second Ethernet MAC address comprises a second vendor identifier and a second device identifier, wherein the second vendor identifier is different from the first vendor identifier, and wherein the second device identifier comprises either the first device identifier or an identifier that is dynamically selected from the first device identifier.

28. The network node as recited in claim 27, wherein the first protocol comprises a USB protocol.

29. The network node as recited in claim 27, wherein the first Ethernet MAC address is unique to the bridge.

30. The network node as recited in claim 27, wherein the second protocol comprises an Ethernet protocol.

31. The network node as recited in claim 11, further comprising:
an application to communicate over the point-to-point interface using the second protocol at a link layer.

32. The network node as recited in claim 27, wherein the point-to-point connection comprises at least one of: a universal serial bus (USB), a FireWire™ connection, a serial connection, or a wireless connection.

33. The network node as recited in claim 27, wherein the first Ethernet MAC address is provided to the attached node before the attached node has been associated with the second Ethernet MAC address.

34. The network node as recited in claim 27, wherein the first Ethernet MAC address is not being used by other like nodes coupled to the bridge.

35. The network node as recited in claim 27, wherein the second Ethernet MAC address is received by the point-to-point interface from the attached node.

36. The network node as recited in claim 27, wherein the second Ethernet MAC address is determined by the point-to-point interface.

37. The network node as recited in claim 27, wherein the first device identifier is randomly selected, or the identifier is mathematically derived from the first device identifier.

38. An apparatus for communicating using dynamically-assigned Ethernet media access control (MAC) addresses over a point-to-point connection between two nodes, the apparatus comprising:
means for dynamically determining a first Ethernet MAC address for a first node of the two nodes in response to sensing that a second node of the two nodes is coupled to the first node via the point-to-point connection, the first Ethernet MAC address comprising a first vendor identifier and a first device identifier, wherein at least one of the first vendor identifier or the first device identifier is dynamically selected;
means for storing the first Ethernet MAC address; and
means for communicating with the second node using the stored first Ethernet MAC address and a second Ethernet MAC address associated with the second node, wherein the second Ethernet MAC address comprises a second vendor identifier and a second device identifier, wherein the second vendor identifier is different from the first vendor identifier, and wherein the second device identifier comprises either the first device identifier or an identifier that is dynamically selected from the first device identifier.

39. The apparatus as recited in claim 38, further comprising:

means for determining that the first Ethernet MAC address is not being used by other like nodes on a network coupled to the first node.

40. The apparatus as recited in claim 38, wherein the first device identifier is randomly selected, or the identifier is mathematically derived from the first device identifier.

* * * * *